Feb. 7, 1967   S. G. HARRIS   3,302,236
APPARATUS FOR PREPARING CRAB BODIES FOR THE
RECOVERY OF MEAT THEREFROM
Filed March 15, 1966   12 Sheets-Sheet 2

INVENTOR.
STERLING G. HARRIS

ATTORNEYS

Feb. 7, 1967

S. G. HARRIS 3,302,236

APPARATUS FOR PREPARING CRAB BODIES FOR THE
RECOVERY OF MEAT THEREFROM

Filed March 15, 1966

INVENTOR.
STERLING G. HARRIS

ATTORNEYS

Feb. 7, 1967 S. G. HARRIS 3,302,236
APPARATUS FOR PREPARING CRAB BODIES FOR THE
RECOVERY OF MEAT THEREFROM
Filed March 15, 1966 12 Sheets-Sheet 4

INVENTOR.
STERLING G. HARRIS
ATTORNEYS

FIG. 10

INVENTOR.
STERLING G. HARRIS

ATTORNEYS

Feb. 7, 1967 S. G. HARRIS 3,302,236
APPARATUS FOR PREPARING CRAB BODIES FOR THE
RECOVERY OF MEAT THEREFROM
Filed March 15, 1966 12 Sheets-Sheet 10

INVENTOR.
STERLING G. HARRIS
BY
ATTORNEYS

Feb. 7, 1967            S. G. HARRIS            3,302,236
APPARATUS FOR PREPARING CRAB BODIES FOR THE
RECOVERY OF MEAT THEREFROM Filed March 15, 1966            12 Sheets-Sheet 11

INVENTOR.
STERLING G. HARRIS

ATTORNEYS

United States Patent Office 3,302,236
Patented Feb. 7, 1967

3,302,236
APPARATUS FOR PREPARING CRAB BODIES FOR THE RECOVERY OF MEAT THEREFROM
Sterling G. Harris, Beaufort, S.C., assignor to The Blue Channel Corporation, Port Royal, S.C., a corporation of Maryland
Filed Mar. 15, 1966, Ser. No. 534,490
15 Claims. (Cl. 17—2)

This is a continuation-in-part of my earlier copending application Serial No. 377,831, filed June 25, 1964, now Patent No. 3,253,299 issued May 31, 1961.

This invention relates to the recovery of meat from crabs, such as the common edible crabs of the Atlantic coasts of North and South America. The Atlantic crabs referred to includes the blue, rock, sand, and other species and the invention may also be utilized in the treatment of the Dungeness crabs of the Pacific coasts of the United States and Canada and crab species found in the North Sea of Europe and elsewhere and having body, leg, and claw conformations similar to those of the blue crab. More particularly, the invention is concerned with apparatus for practicing the novel method of my copending application for preparing cooked crabs for recovery of the meat therefrom for treatment by the practice of the method of my Patent 2,858,223, issued October 28, 1958.

The method of Patent 2,858,223 can be employed for recovering the meat from the bodies of fish or crabs and, when it is used in the treatment of crabs, the crabs are first cooked and, thereafter, in a preliminary operation, the legs and claws are detached. The carapace, gills, mouth parts, apron, and visceral matter are then removed in successive operations and the stripped carcasses are ready to be subjected to the steps of the patented method. Heretofore, the preparation of the stripped crab carcasses for subsequent treatment has been carried out by hand and the cost of the numerous manual operations required has contributed substantially to the cost of the crab meat in suitable condition for packing as fresh crab meat, for canning, for shipment in pasteurized or frozen condition, or for use in combination with other ingredients in various food products.

The present invention is, accordingly, directed to apparatus for transforming cooked whole crabs into stripped carcasses mechanically. The apparatus is comprised of a conveyor on which clamps are mounted for gripping crabs and holding them with their legs and claws and the points of their carapace free and extending laterally; means are also provided on opposite sides of the conveyor for striking the legs and claws on each side of each crab with repeated blows to flex the legs and claws relative to the caparapace. A second conveyor is provided and has holders thereon for engaging the sides of individual crabs at approximately the leg openings and holding their carapace up. Means are provided for freeing the carapace from the body of the crab in each holder and separate means are positioned adjacent to the second conveyor for acting on the bodies in successive holders to remove the gills, remove the mouth parts, detach the apron, clear away the waste material exposed by removal of the apron, and remove the visceral material; means are further provided for releasing the stripped bodies from the successive holders. At the completion of the operations, the stripped carcasses, which are ready for treatment in accordance with the method of Patent 2,858,223, are successively discharge from their holders and the holders are returned to their original position to be reloaded.

For a better understanding of the invention, reference may be made to the accompanying drawings, in which

FIG. 9b is a partial side elevational view of the remainder of the apparatus shown in FIG. 9a;

FIGS. 11 and 12 are sectional views on the lines 11—11 and 12—12 respectively of FIG. 9a;

FIGS. 19 and 20 are sectional views on the lines 19—19 and 20—20, respectively, of FIG. 9b.

The crabs to be processed in accordance with the method by means of the new apparatus shown in the drawings are preliminary cooked in conventional steam retorts or boxes or in boiling water, the cooking conditions depending on the condition and weight of the crabs with the fatter and heavier crabs requiring more severe treatment. Cooking times and temperatures for steam cooking typical crabs may vary widely and the time may range from 15 to 30 minutes at 212° F. to 5 to 15 minutes with the temperatures ranging between 240° and 250° F. When the crabs are boiled, the boiling time ranges from 15 minutes up.

Figure 1:
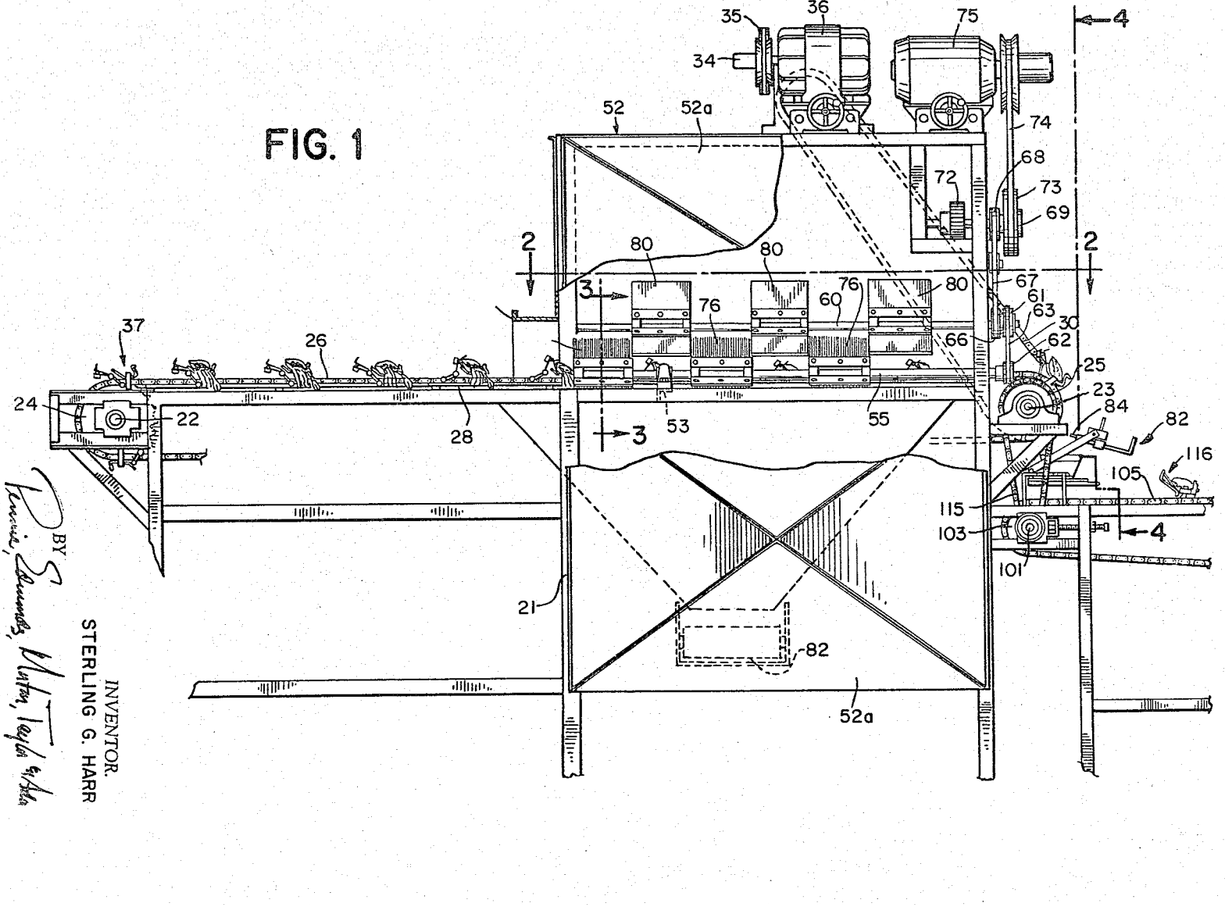
FIG. 1 is a view in side elevation with parts broken away of a form of apparatus for performing the initial steps in the method for the removal of the legs and claws from the crabs.
Figure 2:
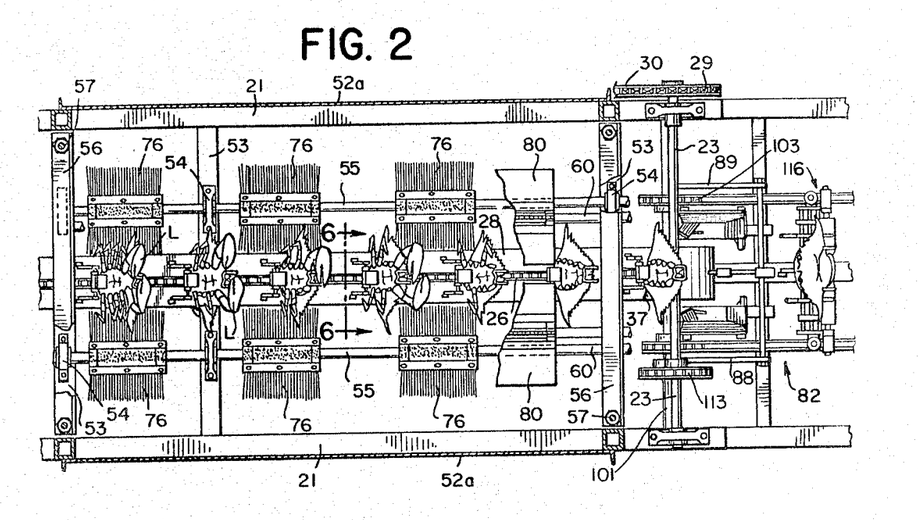
FIG. 2 is a sectional view on the line 2—2 of FIG. 1 with the parts broken away.
Figure 4:
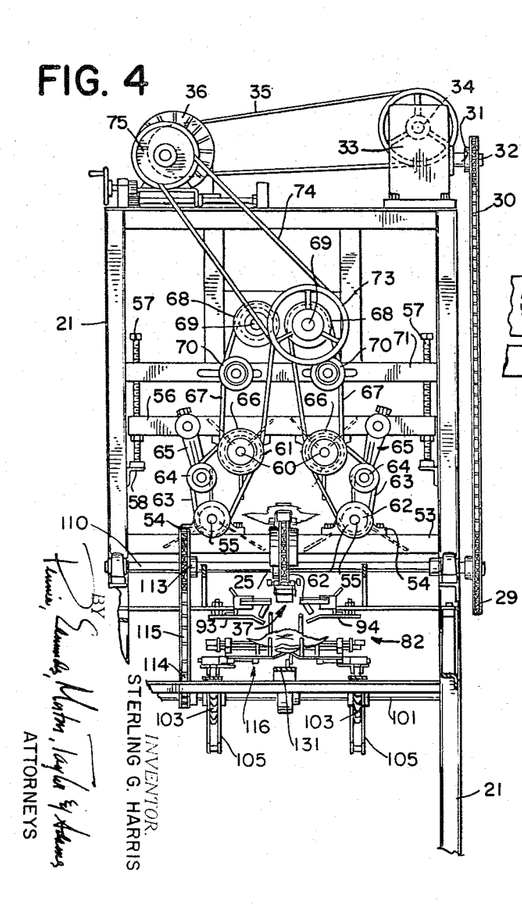
FIG. 4 is a view in rear end elevation of the apparatus of FIG. 1 showing the drive for the apparatus.

The first steps of the method are performed in the apparatus of FIG. 1, to which cooked crabs are delivered at the left-hand end. The apparatus includes a framework 21, which is preferably made of stainless steel tubing square in section and at opposite ends of which shafts 22 and 23 are mounted in suitable bearings. Sprocket wheels 24, 25 on the shafts drive a conveyor chain 26 having rollers 27 (FIGS. 5, 6) and the rollers in the upper stretch of the chain run on a track 28 mounted on and extending the length of the framework. The track is narrow for the minor part of its length starting at the left in FIG. 1 and the rest of the track is wide. A sprocket wheel 29 (FIG. 2) on shaft 23 is connected by a chain 30 to a sprocket wheel 31 on the output shaft 32 (FIG. 4) of a speed reducer 33 having an input shaft 34 driven through a belt 35 by a motor 36 mounted on top of the framework.

Clamps 37 are mounted at intervals along the chain 26 and each clamp includes a fixed jaw formed of a plate 38 secured to ears extending laterally from the links of the chain and a stirrup 39 mounted on top of the plate. The stirrup is formed of a rod of U-shape with its bight at the forward end of the plate and extending upwardly from the plate and rearwardly and its legs 39a extending upwardly at an angle to the plate. The fixed jaw provides a seat for a crab with the stirrup acting as an abutment engaged by one end of the crab. The other jaw of each clamp is movable and is formed of an L-shaped plate 40 pivoted near one end of a plate 41 having its other end loosely encircling a shaft 42 mounted in lugs 43 secured to the plate 38 near its rear edge. When the clamp is in use, the plate 41 extends upwardly from the plate 38 and the long leg of the jaw 40 extends downwardly from its attachment to the plate 41 with its lower edge resting on top of the plate 38. The short leg of the jaw 40 extends forwardly from the long leg at the upper end thereof and the legs at their junction form an abutment for the other end of the crab. A collar 44 having an arm 45 extending radially therefrom is mounted rigidly on each end of the shaft 42 and a roller 46 is pivotally mounted on each arm 45 near its lower end. The rollers do not engage the narrow part of the track 28 but run up on and travel along the wide part. A U-shaped spring 48 has a bight extending across the rear face of the plate 41 and each leg of the spring is formed with a convolution encircling the shaft 42 and an end section 48a partially encircling one of the arms 45. The plate 38 is provided with side plates 49 which carry rollers 50 underlying the edges of the wide part of the track 28.

Figure 3:
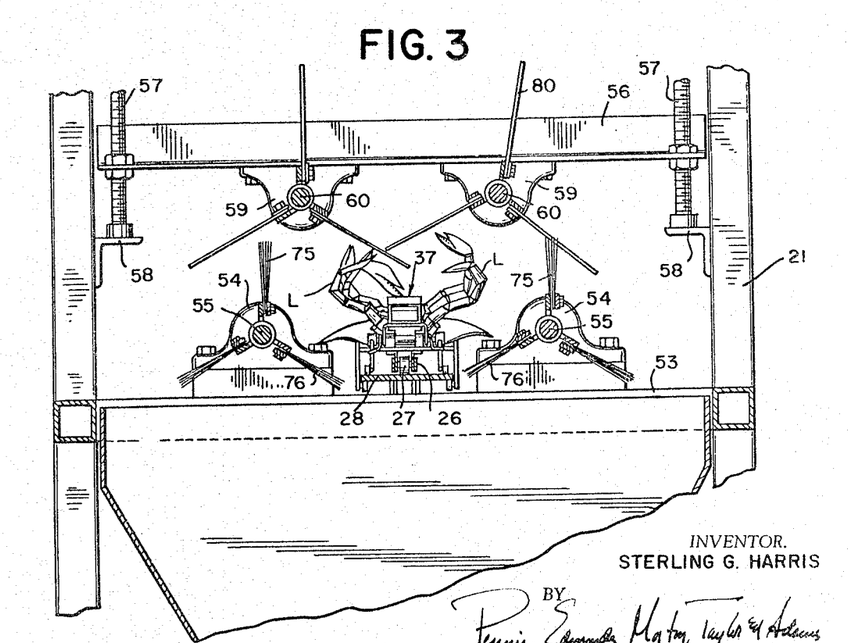
FIG. 3 is a sectional view on the line 3—3 of FIG. 1.

Beyond the front end of the wire part of the track 28, the upper stretch of the chain 26 passes through a hood 51 into a housing 52 formed by metal sheets 52a attached to the framework 21. Within the housing, the framework includes lower crosspieces 53 (FIGS. 2, 3), on which are mounted bearings 54 supporting a pair of parallel shafts 55 on opposite sides of the chain. Upper crosspieces 56 are mounted in the housing on adjusting screws 57 supported on brackets 58 attached to the framework and carry bearings 59 for a pair of parallel shafts 60 on opposite sides of the chain. At the rear ends (FIG. 4), the shafts 60 carry pulleys 61 connected to pulleys 62 on the shafts 55 by timing belts 63, which are kept taut by idler pulleys 64 on arms 65 secured for angular adjustment on the upper crosspiece 56 at the rear end of the machine. Shafts 60 also carry pulleys 66 connected by timing belts 67 to pulleys 68 on shafts 69, the belts being kept taut by idler pulleys 70 on an upper crosspiece 71 mounted on the adjustment screws 57. If desired, the timing belts 63 and 67 may be replaced by chains, in which event pulleys 61, 62, 64, 66, 68 and 70 are replaced by sprocket wheels. The shafts 69 are mounted in suitable bearings on the framework and are connected together by meshing gears 72 (FIG. 1). One of the shafts 69 carries a grooved pulley 73 connected by a belt 74 to a motor 75 on the top of the framework.

Just inside the housing 52, each lower shaft 55 carries a group of beaters 76, which are preferably brushes with stiff bristles formed of a suitable synthetic plastic material. There are three brushes 76 in each group and the beaters are spaced at equal angles about the shaft. The shafts are rotated in such direction that the brushes travel upwardly on each side of the conveyor chain 26 and lift the legs and claws L of crabs held in clamps on the chain. In their movement, the brushes strike the points of the carapace of the crabs but the bristles separate and are thus not damaged by their contact with the carapace.

Immediately beyond the groups of brushes 76 on the shafts 55, each shaft 60 carries a group of beaters 80 which are mounted in groups on the shafts in the same way as the brushes and are made of a suitable material, such as a flexible but relatively stiff synthetic plastic sheet material. In the machine shown, there are three beaters 80 in each group and the radial length of the individual beaters is such that, as the shafts 60 rotate, the beaters on the shafts pass over the top of the carapace of the crabs held in the clamps on the conveyor chain but strike the legs and claws L raised by the brushes 76.

The shafts 55 carry a number of spaced groups of brushes 76 and, in the apparatus illustrated, there are three groups of brushes on each shaft and each shaft carries a like number of groups of sheet beaters 80. The brushes in corresponding groups on shafts 55 are aligned as are also the beaters on shafts 60 and the groups of brushes 76 on shafts 55 are staggered in relation to the groups of beaters 80 on shafts 60.

As each clamp 37 on the conveyor chain 26 enters the upper stretch of the chain, the rollers 46 on the arms 45, which operate the spring 48 of the clamp, are not in contact with the track 28 and the arms 45 swing downwardly and cause the plate 41 to swing away from the stirrup 39 and move the jaw 40 along the plate. As a result, the clamps on the chain between the sprocket wheel 24 and the left-hand end (FIG. 1) of the wide part of the track are fully open. A crab is placed in the stirrup of each open clamp with its carapace down and the mouth end of the crab in contact with the leading end of the stirrup. When the arms 45 strike the end of the wide part of the track, they are swung and the rollers 46 on the arms 45 ride up on the track. The movement of the arms flexes the spring, so that is rocks the plate 41 toward the stirrup and this causes the long leg of the jaw 40 to slide along the plate 38. The short leg of the jaw overhangs the rear edge of the crab and, as the movement of the jaw continues, the front and rear edges of the crab are seated firmly against the abutments provided by the stirrup and the legs of the jaw 40 at their junction. In the sliding movement of the long leg of the jaw 40 along the plate 38, the junction of the legs of the jaw travels approximately in a plane, so that crabs of different sizes are held by the clamp in about the same angular relation to the plate 38. The result is that the knuckles of crabs in the clamps are at about the same elevation regardless of the size of the crabs and this facilitates removal of the lesg and claws.

During the travel of the crab through the housing, the legs and claws are repeatedly struck, first by the brush beaters on the lower shafts and then by the sheet beaters on the upper shafts, with the two types of beater acting in alternation. The repeated flexing of the legs and claws breaks them loose at the knuckles and, at some stage in the travel of a crab through the housing, its legs and claws are torn free and drop into a pan 81 mounted on the framework of the housing and having a discharge opening over a conveyor belt 81a which carries the legs and claws away from the housing.

Figure 5:
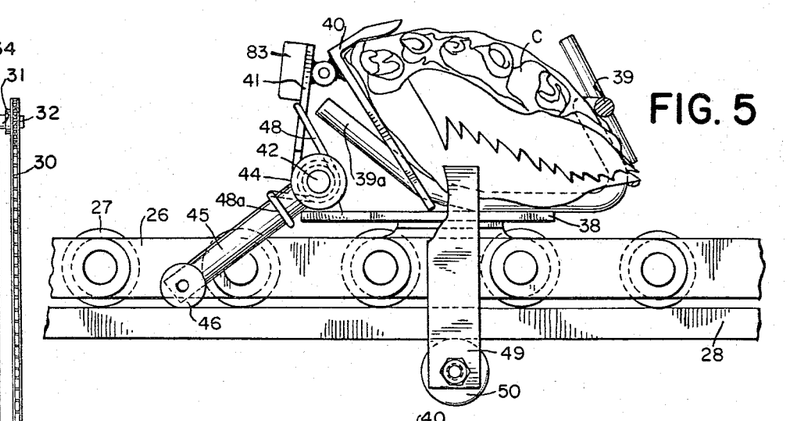
FIG. 5 is a view in side elevation on an enlarged scale of part of the conveyor with a clamp for holding the body of a crab while the legs and claws are being detached.
Figure 6:
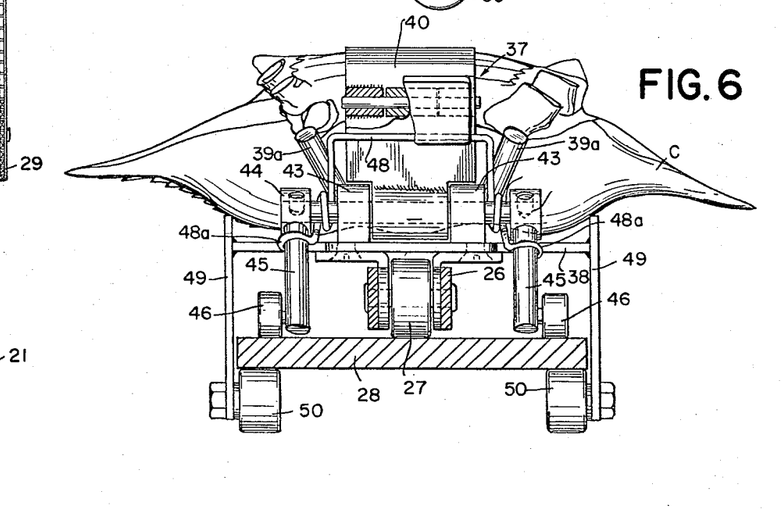
FIG. 6 is a transverse sectional view through the conveyor shown in FIG. 5.
Figure 8:
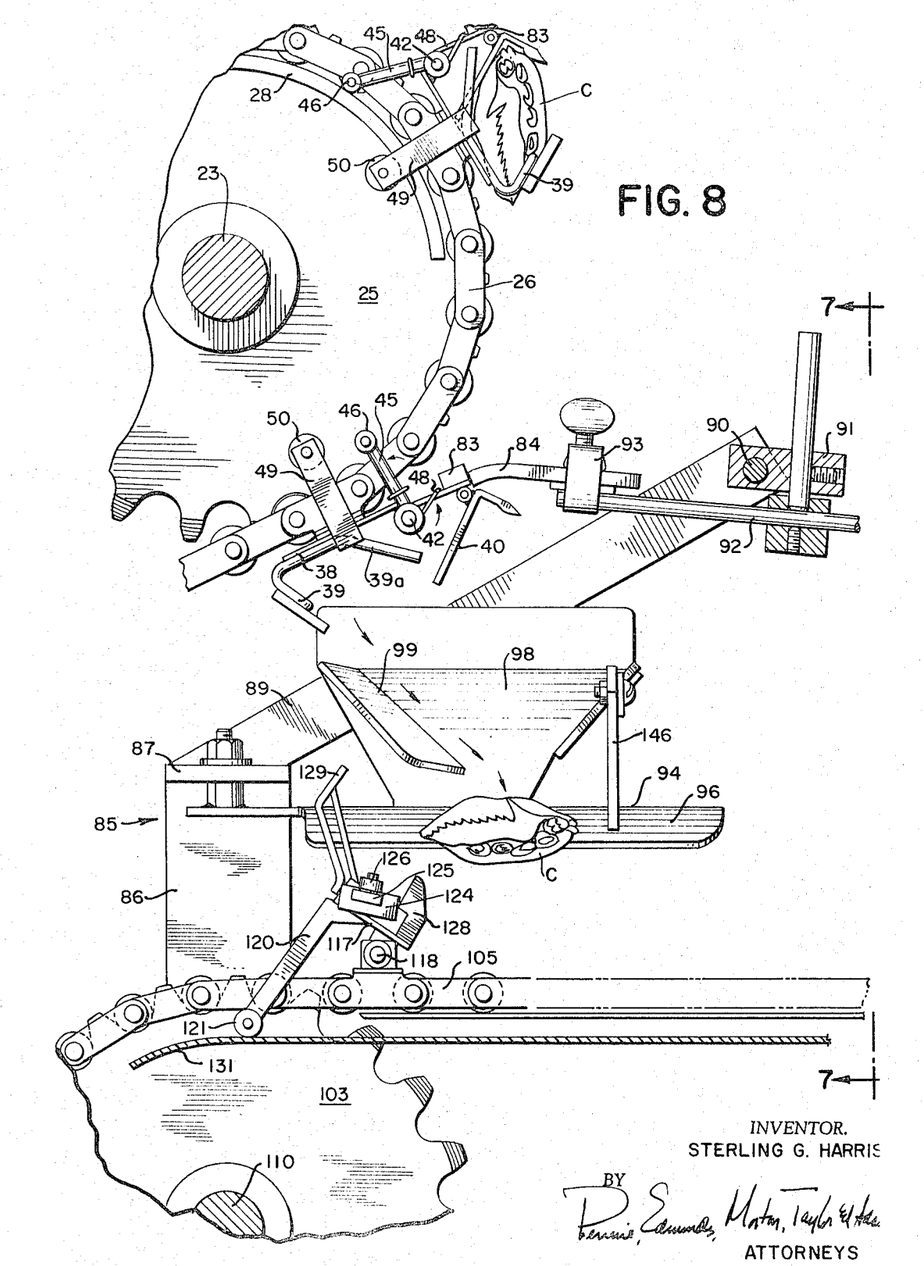
FIG. 8 is a fragmentary side elevation taken substantially along the lines 8—8 of FIG. 7.

At the outlet end of the apparatus transfer means 82 is provided for removing the crab from the clamp of the first conveyor, inverting the crab and inserting it into a clamp in a second conveyor for further operations. The track 28 curves through about 90° following the curvature of the sprocket wheel 25 before it ends; as the rollers 46 of the clamps leave the end of the track 28, the upper jaws 40 of the clamps are released but the crabs remain in the stirrups until the clamps are carried by the chain further around the sprocket wheel so that the crab body is inverted with the carapace on top. Mounted on and protruding rearwardly from the plate 41, as shown in FIGS. 5 and 8 is a block 83 which contacts a cam rod 84 when the clamp has travelled around the wheel to the extent that it is substantially inverted and fully opens the clamp so that the crab is released.

The transfer means 82 includes a framework 85 consisting of a pair of upstanding members 86 mounted on the framework of the second conveyor which support a pair of inwardly transversely extending spaced supporting plates 87. Rigidly mounted to the transverse support plates 87, which are positioned substantially beneath the sprocket wheel 25, are a pair of laterally spaced angular rearwardly extending support plates 88 and 89 which hold a rod 90 extending transversely across the apparatus. Attached to the rod at substantially the middle thereof is a first adjustable connector 91 which holds a rod 92 extending longitudinally with respect to the apparatus. A second adjustable connector 93 is mounted on one end of the rod 92 and holds the cam rod 84 in proper position to contact the cam block 83 for the purpose described.

Figure 9A:
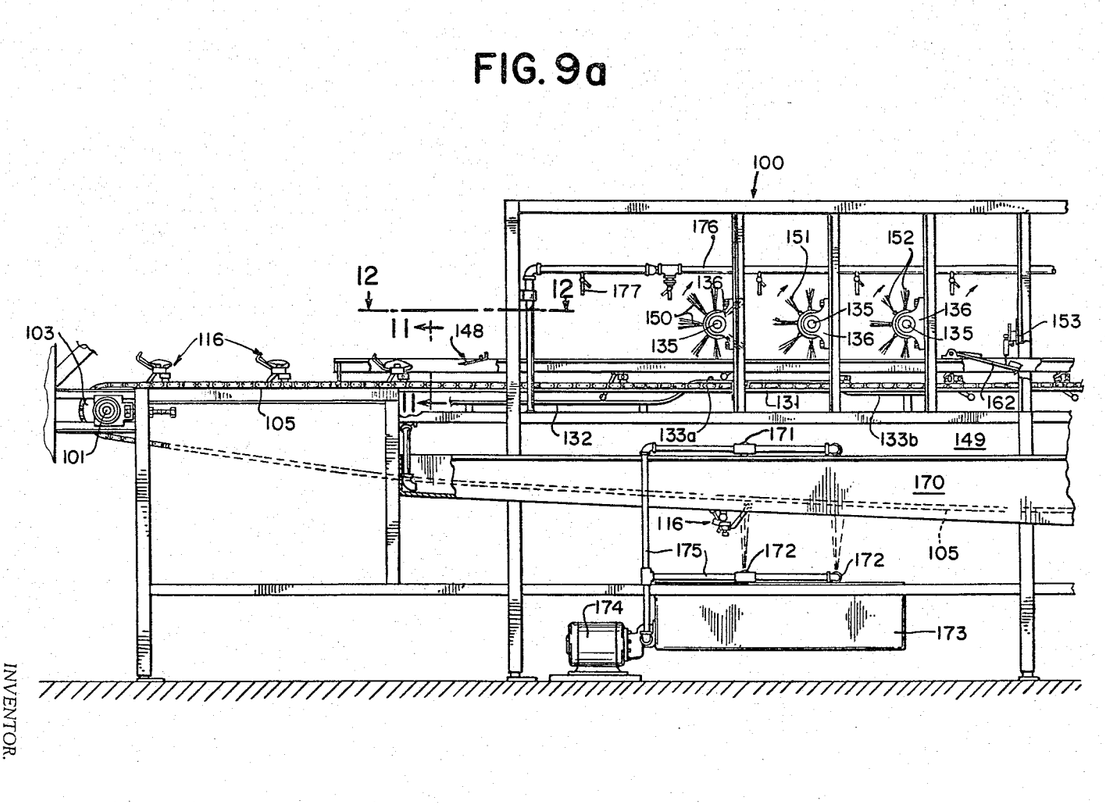
FIG. 9a is a partial side elevational view of an apparatus for practicing the remaining steps of the new method.

Mounted on the transverse support plates 87 and extending longitudinally therefrom are a pair of parallel guide plates 93 and 94. The guide plates have inwardly converging sloping surface portions 95 and 96 which are spaced apart enough to hold the crab body spanning the plates. The guide plates are mounted laterally adjustable to accommodate crabs of different sizes. Mounted on the guide plates and extending vertically therefrom are side plates 97 and 98 which support a sloping wall surface 99 mounted between the side plates; the sloping wall surface is positioned to underlie the clamp when it is opened and releases the crab. When released, the inverted crab, carapace up, slides down the sloping wall surface and becomes positioned spanning the guide plates where it remains until it is removed by the apparatus shown in FIGS. 8, 9a and 9b.

The apparatus includes a framework 100 of stainless steel square tubing which is closed by metal sheets to form a housing and at opposite ends of which shafts 101, 102 are mounted in suitable bearings, the bearings for shaft 101 being adjustable. A pair of sprocket wheels 103 are mounted on shaft 101 and shaft 102 carries similar sprocket wheels 104. A pair of conveyor chains 105 with rollers 106 are trained about aligned sprocket wheels on the two shafts and the lower stretch of each chain is guided by an idler sprocket wheel 107 on a shaft in bearings on the framework. The chains are kept taut by adjustment of the bearings for shaft 101. The shaft 102 carries a sprocket wheel 108 driven through a chain 109 by a speed reducer 110, which is driven through a belt 111 by a motor 112 on the top of the framework.

Mounted on the sprocket wheels 113 and 114 which are fixed to shaft 23 and shaft 101 respectively of the first and second conveyor is a synchronizing chain 115 which synchronizes the relative speed of each conveyor.

Figure 11:
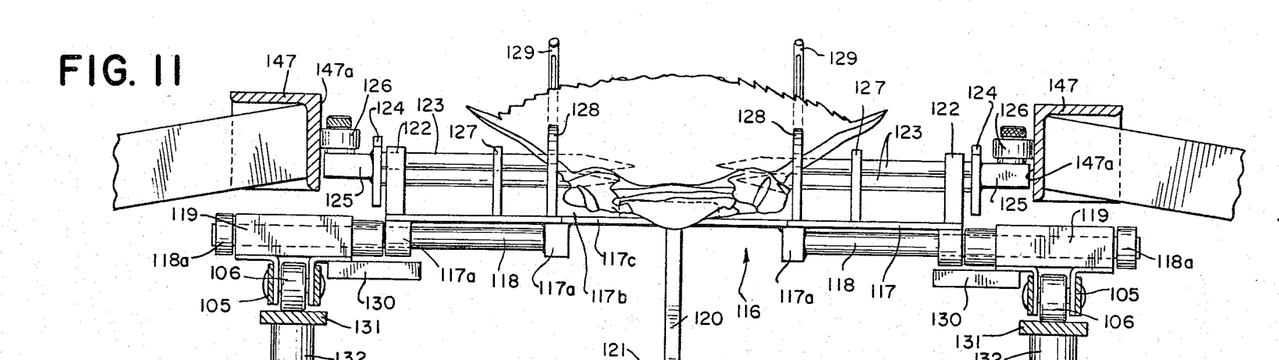
Figure 12:
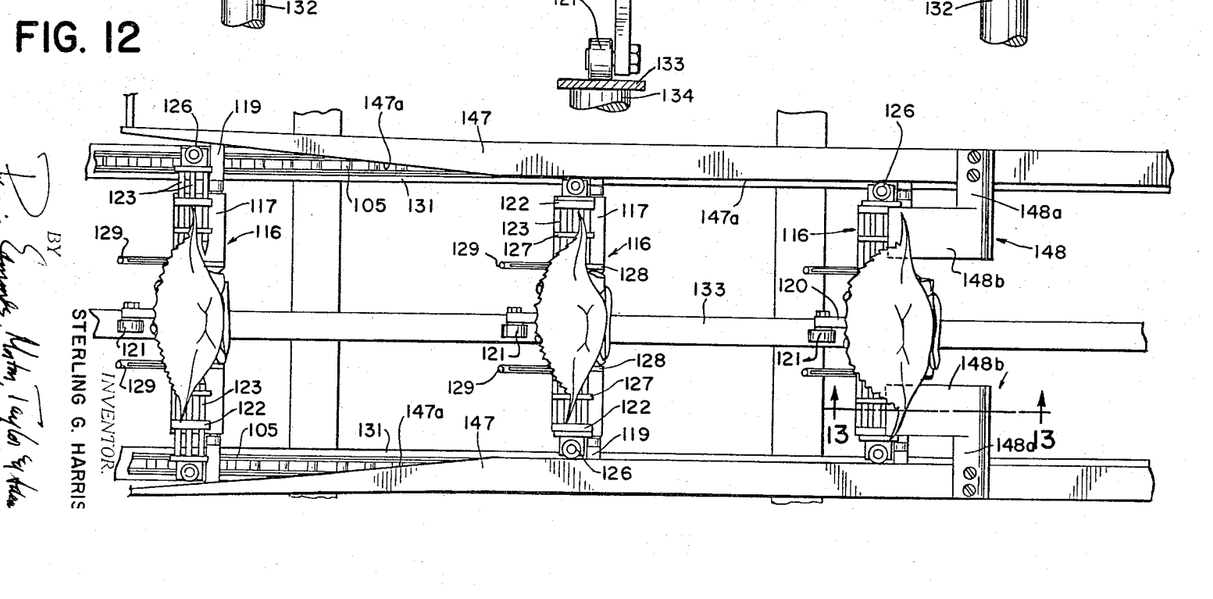
Figure 13:
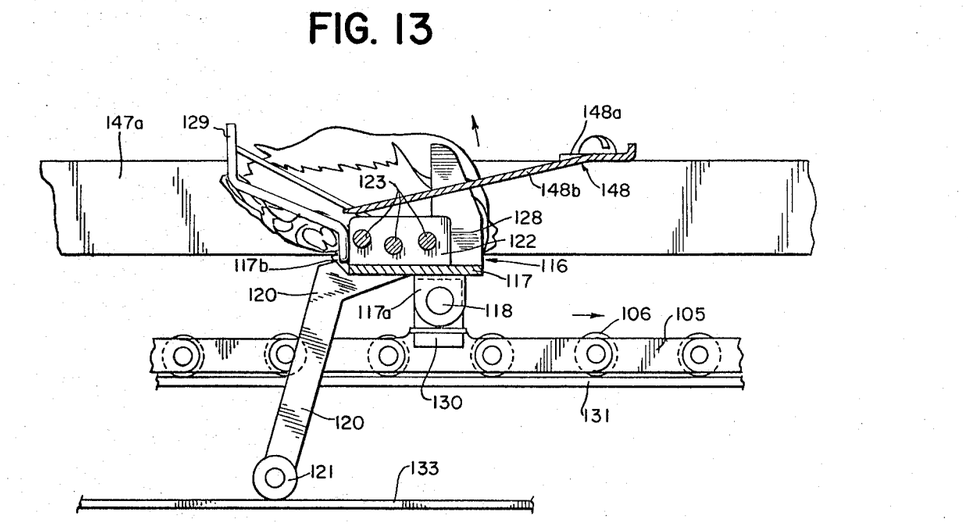
FIG. 13 is a sectional view on the line 13—13 of FIG. 12.

Holders 116 for crab bodies are mounted at intervals on the chains 105 and each holder (FIGS. 8, 11 and 12) includes a base plate 117 lying between the chains and connected rigidly to aligned shafts 118 by ears 117a extending downwardly from the plate near its forward edge and encircling the shafts. Each shaft 118 is mounted in a bearing block 119 secured to laterally extending ears on links of a chain 105 and the shafts are held in place by collars 118a at their outer ends. An arm 120 is secured to the under surface of the plate 117 near its rear edge midway between its ends and carries a roller 121 at its lower end. A pair of side plates 122 are mounted on top of the plate 117 along its side edges and each side plate has openings for three pins 123 extending inward from the side plate and having pointed inner ends. The pins of each set are secured to a vertical plate 124, which lies outwardly from a side plate 122 and has a block 125 carrying a stud, on which a roller 126 is mounted. Inward from the side plates, the pins of each set pass through openings in a pair of vertical guide plates 127 mounted on top of the plate 117. The forward edge of the inner guide plates of each pair are provided with front upward extensions 128, which serve as stops for the rear end of a crab body to be held in the holder. Attached to the rear edge of the plate 102 are a pair of rear upward extensions 129 which extend upwardly to a greater extent than the front upward extensions 128. The middle part 117b of the forward edge of the plate 117 is cut away to form a notch 117c. The plate 117 is movable about the common axis of shafts 118 and stop plates 130 for limiting the downward movement of the plate are mounted on the inner ears of the links of chains 105, to which the blocks 119 are attached.

The rollers 106 in the upper stretches of the chains 105 run on tracks 131 on posts 132 attached to the framework and the rollers 121 of the holders run on a cam track 133 lying between the tracks 131 and mounted on posts 134 attached to the framework. The track 133 has portions at different levels and is interrupted in order to cause the holders to be tilted at various angles for purposes to be described.

Figure 10:
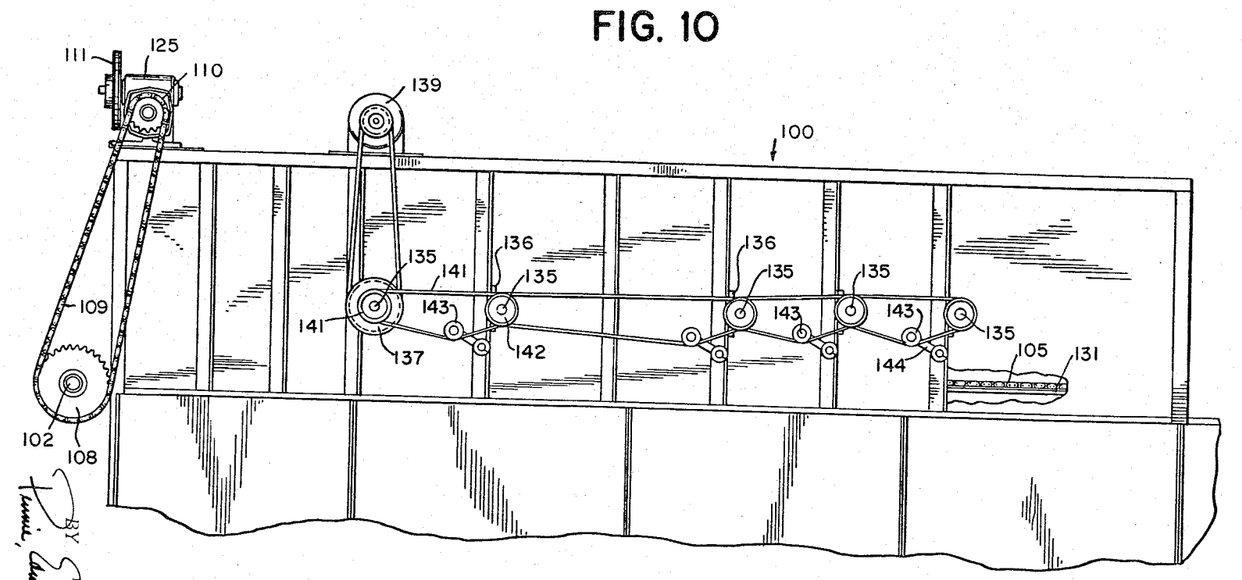
FIG. 10 is an elevational view showing the drive for the apparatus of FIGS. 9a and 9b.

A plurality of shafts 135 are mounted to extend across the framework 100 in bearings 136 attached to upright members of the framework. The shaft nearest the rear end of the housing carries a pulley 137 (FIG. 10) driven through a belt 138 by a motor 139 on the top of the framework. The shaft carries a second pulley 140 connected through a belt 141 to a pulley 142 on the next shaft 135 in the series and the belt is kept taut by a belt tightener pulley 143 on an arm 144 mounted for angular adjustment on the framework. In like manner, each of the shafts 135 is driven through a belt by the shaft at one side and drives the shaft at the other side through a belt and all of the belts have belt tighteners similar to that provided for the belt 141. The belts may be timing belts or V-belts or, if desired, they may be replaced by roller chains, in which case, the pulleys will be replaced by sprocket wheels.

Figure 7:
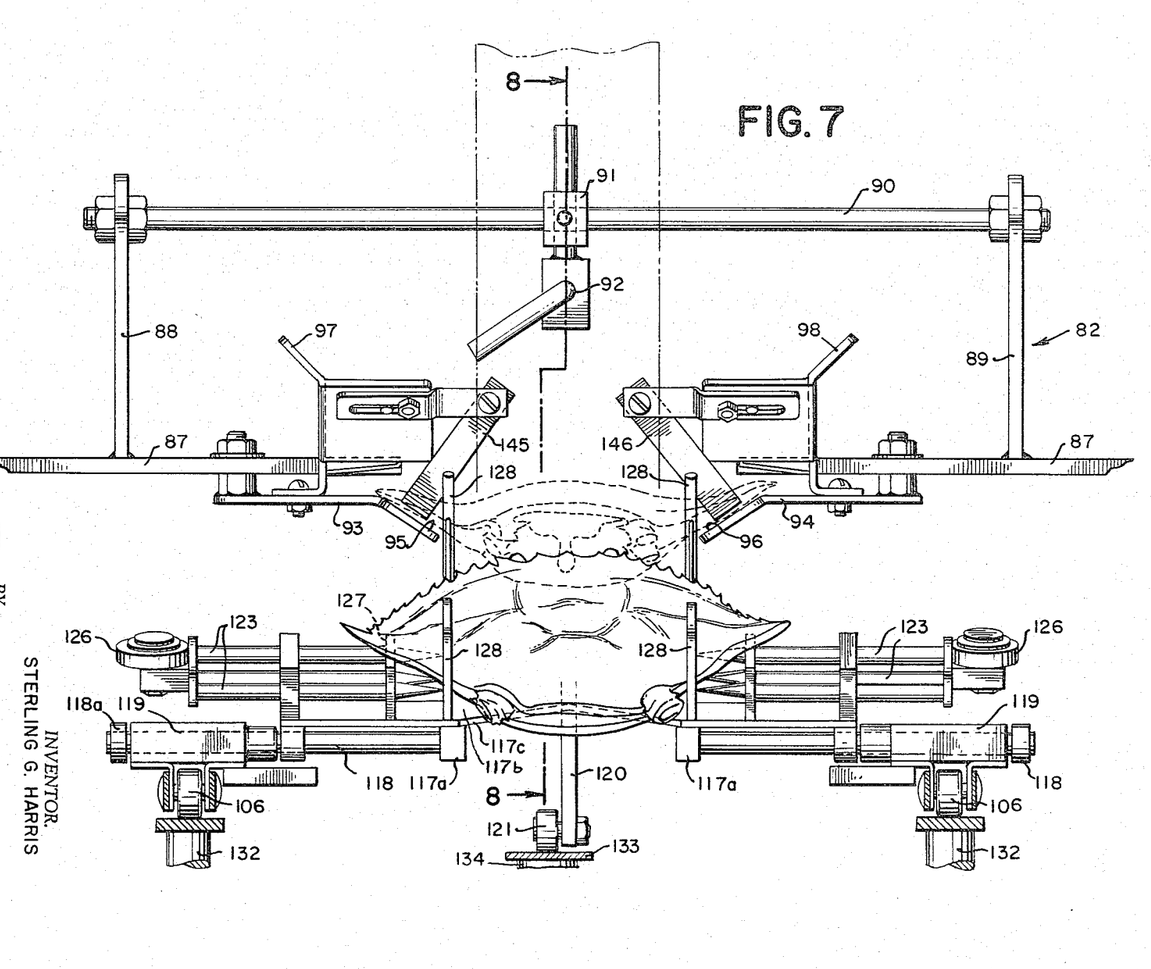
FIG. 7 is an enlarged view in rear end elevation of apparatus substantially as shown in FIG. 4 for transferring the body of the crab from the first conveyor to a second conveyor.

As shown in FIG. 8 the roller 121 rides on the track 133 adjacent sprocket wheels 103 at the inlet end of the second conveyor. The track is positioned to tip the holder 116 forward so that it pivots on shaft 118 with the plate 117 cocked to make an angle of about 60° to the horizontal with its rear edge up causing the rear upward extensions 129 of the holder to extend upwardly in the space between the pair of guide plates 93 and 94 and contact the crab suspended on the guide plates and slide the crab longitudinally in the direction of travel of the holder. As shown in FIGS. 7 and 8, adjustably mounted on the side plates 97 and 98 and protruding downwardly adjacent the sloping surface portions 95 and 96 of the guide plates are a pair of resilient straps 145 and 146. As the crab is slid along the guide plates by the packing action of the upward extensions 129, it contacts the straps and aligns the crab evenly, as indicated is dotted in FIG. 7, and further longitudinal movement pushes the crab past the straps which yield to pressure and the crab falls off the guide plates into the holder with the carapace up, its front end facing to the rear, and its apron end against the stops 128 and overlying the notch 117c.

A pair of cam tracks 147 (FIGS. 11, 12) are mounted on the framework 100 on opposite sides and above the level of the upper stretch of the chains 105 and the tracks have opposed vertical surfaces 147a, the left-hand ends of which converge in the direction of travel of the chains. When a holder is transferred around the sprocket wheels 103 it pushes the crab body off the guide plates and into the holder as described, the loaded holder is advanced between the cam tracks 147, the rollers 127 on the studs carried by the blocks 125 attached to the plates 124, to which the pins 123 are secured, engage the converging surfaces 147a and, as the movement of the holder continues, the rollers are forced inwardly so that the pins enter the body of the crab. The pins are so arranged that, when a crab body is placed on the holder as described, the pins will normally enter leg openings of the crab body.

Figures 9B, 20:
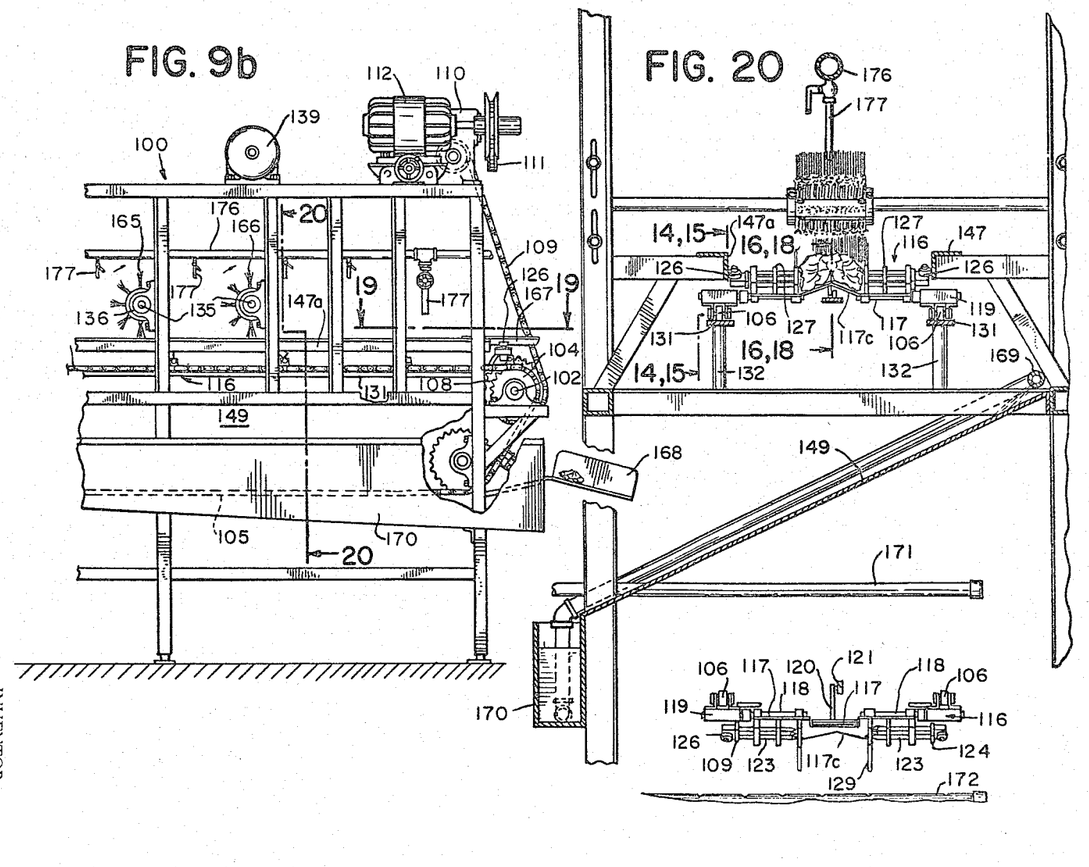

A pair of L-shaped wedge plates 148 (FIG. 12) attached by means of their short legs 148a to the top of the cam tracks 147 and the long legs 148a extend downwardly and forwardly between the tracks 147. As the holders are advanced, the rollers 121 on the arms 120 of the holders rest on the track 133 and the plates 117 of the holders lie approximately horizontal. As a holder approaches the ends of the long legs 148a on the wedge plates 148, the points of the carapace of a crab in the holder lie at a higher level than that of the ends of the legs 148b and, as the movement of the carriage continues, the points of the carapace pass over the ends of the legs. During the continued movement of the carriage, the points of the carapace slide up legs 148b and the carapace is lifted clear of the crab body and falls upon a plate 149 mounted on the framework 100 and extending at an angle between the upper and lower stretches of the chains 105 (FIG. 20).

Figure 14:
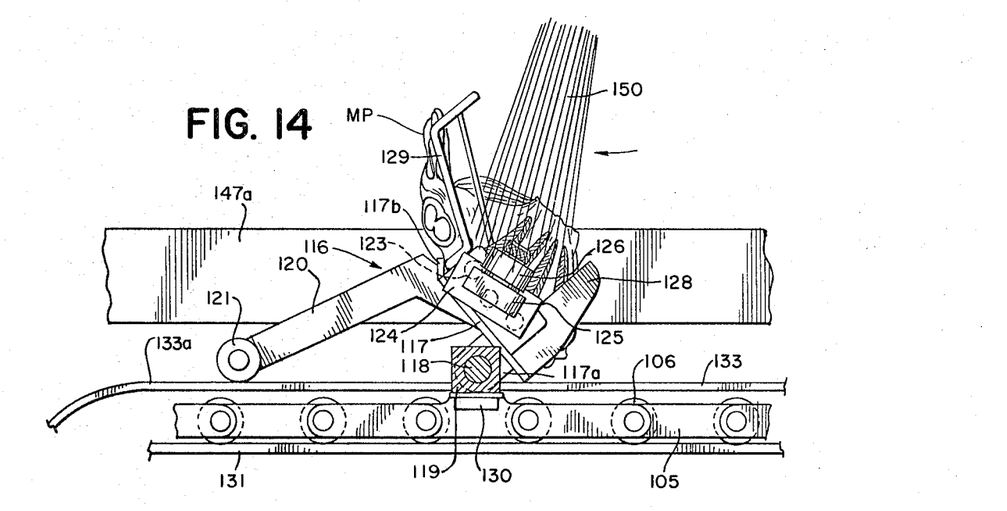
FIGS. 14, 15, 16 and 18 are sectional views on the lines 14—14, 15—15, 16—16, and 18—18, respectively, of FIG. 20 showing the performance of different steps in the method.

The shaft 135 at the front end of the framework carries a group of brushes 150 with stiff bristles, which are preferably made of a suitable synthetic plastic material, such as nylon. As a holder approaches the brushes (FIG. 14), the roller 121 on the arm 120 attached to the plate 117 of the holder rides up on an elevated stretch 133a of the track 133 and, as a result, the plate is rocked to make an angle of about 60° to the horizontal with its rear edge up. In this position, the mouth parts MP of the crab body in the holder extend upwardly at the rear edge of the body and are in position to be struck and torn free by the brushes 150. The holder remains at the angle of 60° to the horizontal as the carriage passes beneath the second of the shafts 135, on which there are mounted a plurality of brushes 151 similar to the brushes 150. The brushes 151 complete the removal of the mouth parts from the body.

Beyond the second shaft 135, the cam track 133 curves downwardly to a level 133b (FIG. 15) below the tops of the chains 105 and, as a result, the arm 120 of a holder swings counterclockwise and the plate 117 of the holder assumes a position at an angle of about 20° to 30° to the horizontal with its rear edge raised. The holder in this position passes beneath the third shaft 135 which carries a set of brushes 152 similar to the brushes 150. The brushes 152 remove the gills from the crab body.

Figures 16, 17:
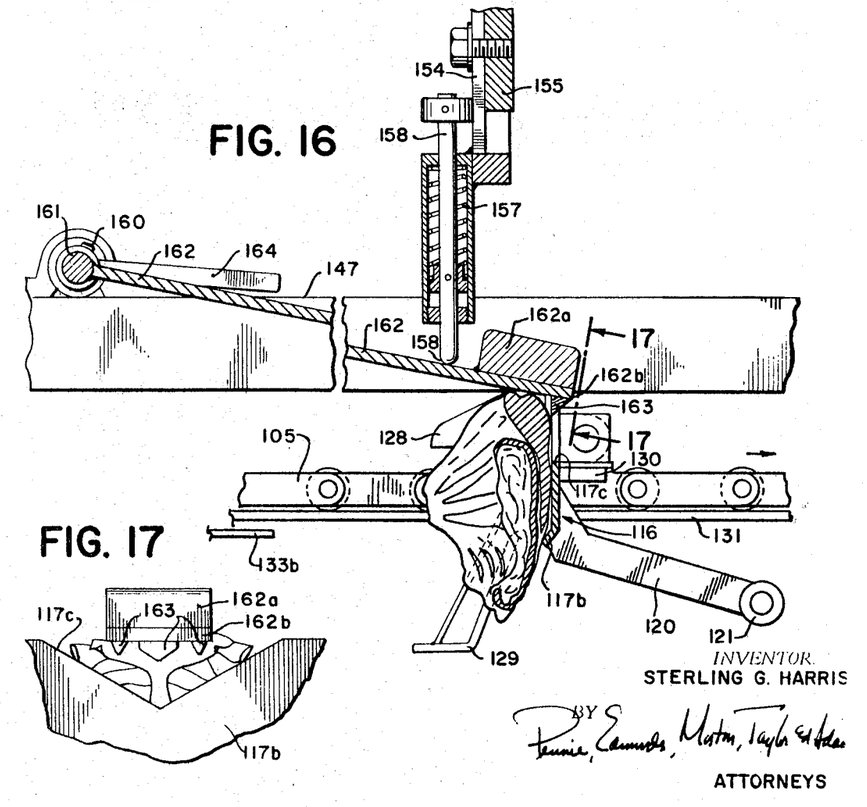
FIG. 17 is a sectional view on the line 17—17 of FIG. 16.

Beyond the third shaft 135, a cross-bar 153 (FIG. 16) is mounted on upright members of the framework and at its midpoint, carries an adjustable mount 154 in which a vertical bar 155 is adjustably held.

Secured to the bar is a cylinder housing 156 in which a spring 157 is mounted. A rod 158 extends vertically axially through the housing and is mounted biased downwardly from the lower end of the housing. A pair of bearings 159 and 160 are mounted on opposite sides of the tops of cam tracks 147 forward of the bar 155 and have a shaft 161 spanning the tracks and mounted in the bearings. Fixed to the shaft is a lever 162 which extends beneath the bar 155 and has a weight 162a on the top of the extended end edge 162b. Extending downwardly from the bottom of the end edge 162a are three wedge shaped teeth 163. Fixed to the shaft 161 is a stop arm 164 which is mounted adjacent one bearing and contacts the top of the cam track to hold the lever in its proper position with the teeth 163 in alignment with the advancing holder to pass through the notch 117c. The rod 158 overlies the lever 162 and its rounded end 158a contacts and resiliently holds the lever in its aligned position as the crab body passes by.

The cam track 133 terminates just beyond the third shaft 135 and, when the roller 121 on the arm 120 of a holder runs off the end of the track, the plate of the holder is swung by gravity to a vertical position against the rear edges of the stop plates 130. In this position of the plate, the notch 117c is at the top. With the arm held as described, the teeth 163 are positioned to engage the apron in a crab body in a holder with its plate in vertical position, and, as the holder advances past the hook, the teeth engages the apron and tears it loose. In this operation, the movement of the crab body past the teeth tends to pivot the arm 162 counterclockwise but the resistance of the spring biased rod contacting the arm holds the teeth in contact with the apron until it has been detached from the crab body.

Figure 18:
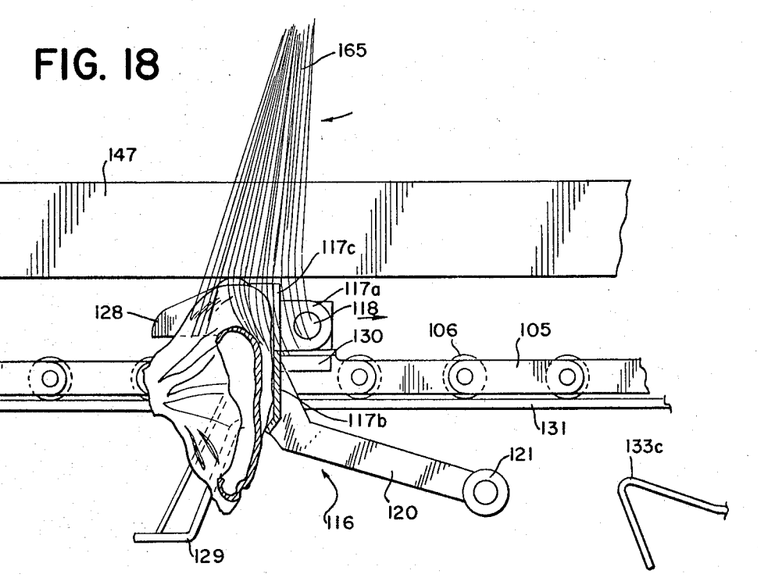

The fourth shaft 135 (FIG. 9b) carries a set of brushes 165 similar to the brushes 150 and the holders 116 (FIG. 18) continue in upright position beneath the brushes 165. The brushes clear away the debris resulting from the tearing loose of the apron, and as a carriage passes from beneath the brushes 165, its roller 121 engages the curved end 133c of a second section of the cam track 133 and the plate of the carriage is thereby swung back toward the horizontal.

Figure 15:
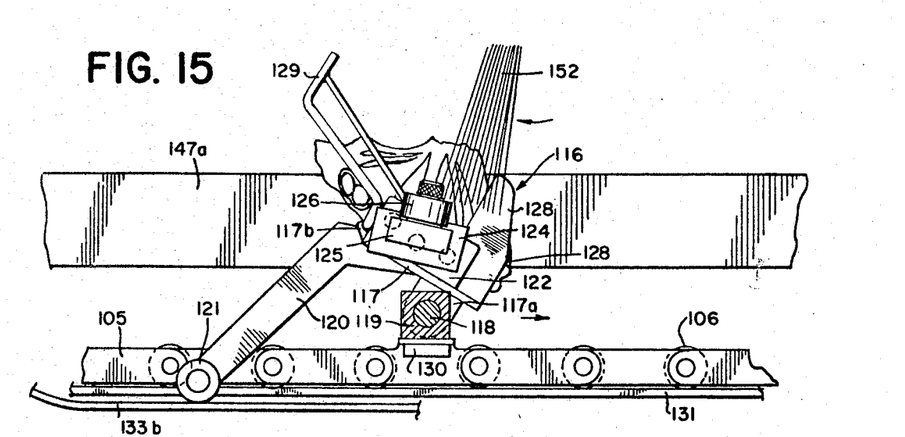

The fifth shaft 135 carries a set of brushes 166 and, as the holders pass beneath these brushes, the elevation of the cam track 133 is such that the plates of the holders are held at a low angle to the horizontal similar to that shown in FIG. 15. The brushes 166 remove the visceral matter from the crab bodies.

Figure 19:
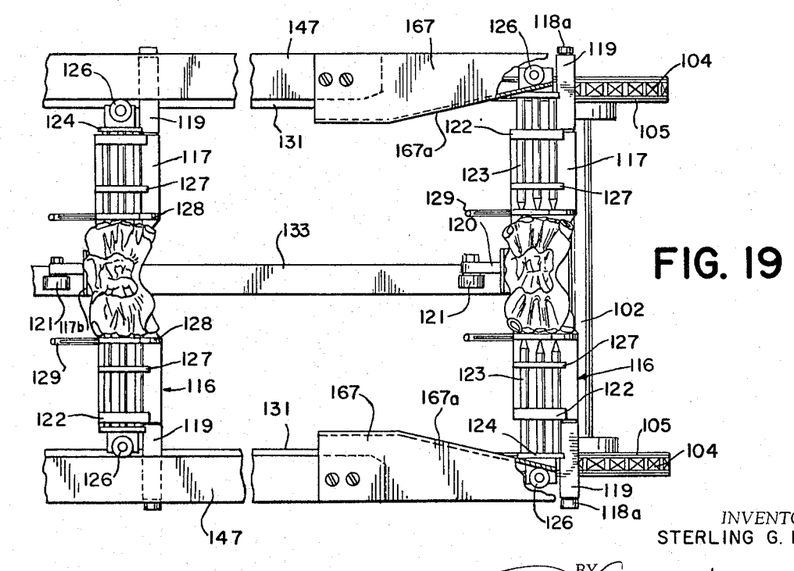

A pair of cam channels 167 (FIG. 19) are mounted on the ends of the cam tracks 147 and the inner walls 167a of the channels diverge in the direction of travel of the holders. When the rollers 126 of a holder enter and travel through the channels 167, the rollers are forced apart and this causes the pins 123 on the holder to be withdrawn from the crab body in the holder. As the holder travels over the sprocket wheels 104, the stripped crab body falls out of the holder and lands on a delivery chute 168.

In order to carry away waste material removed from the crab bodies within the enclosed portion of the framework 100 and collected upon the plate 149, a water pipe 169 (FIG. 20) with jet openings is mounted to extend along the upper edge of the plate and the material washed from the plate by the water is collected in a trough 170. The returning stretches of the chains pass between upper and lower water pipes 171, 172 having jet openings through which water and disinfectant are sprayed on the chains and the holders to clean and disinfect them. The water from the upper pipes falls upon the plate 149 and is collected in the trough 170 and flumed to plant refuse drains while the disinfectant from the lower pipe is collected in a pan 173 and is recirculated by a pump driven by a motor 174 (FIG. 9a) connected to the pipes 171 by piping 175. Water is also discharged upon the carriages in the holders on the upper stretches of the chains through a pipe 176 having controllable branches 177 directed downward along the line of travel of the crab bodies.

In the practice of the method of the invention by means of the apparatus described, the cooked crabs are held by engagement with their carapace and ventral surface between the sides thereof and the crabs are advanced along a straight path in one level with their legs and claws extending laterally. During the travel of the crabs, their legs and claws are repeatedly flexed in planes transverse to the longitudinal axis of the crab by being struck by rotary beaters, which are preferably stiff brushes. The legs and claws thrust away from the carapace by the brush beaters tend to spring back but are struck by stiffer beaters acting in the same direction as the first beaters. The combined actions of the two kinds of beaters cause the legs and claws to be broken off at the knuckles and thrown clear.

The crabs are then transferred to a second level where they are next engaged at their sides below the points of the carapace and are advanced along a rectilinear path. The carapace on each body is engaged from beneath and freed from the body by a wedging action as the body is advanced and this leaves the mouth parts accessible for easy detachment and exposes the gills and the visceral cavity. As the movement of the crab bodies continues, the mouth parts are broken off, the gills are removed, the apron is torn free from the body, the waste material exposed by removal of the apron is removed, and the visceral cavity is cleaned out. Except for the removal of the carapace and apron, the operations described are performed by rotating brushes while the removal of the carapace and apron is effected by stationary members. During the performance of the operations, the crab bodies are held at different angles in which the brushes and members operate most effectively. The carapace must be removed first but the mouth parts and gills can be removed in that order or vice versa, although it is preferable to remove the gills first. The removal of the apron then follows, after which the waste material exposed, when the apron is removed, and the visceral matter are removed.

When the operations described have been completed, the stripped carcasses are ready for treatment in accordance with the method of my Patent 2,858,223 and the preparation of the crab bodies for the purpose have involved no manual operations other than the placing of the crabs in the clamps. The time consumed in the operation has, accordingly, been greatly reduced as has also the cost.

I claim:

1. An apparatus for preparing crabs for the recovery of the meat therefrom, which comprises a conveyor, clamps on the conveyor for gripping crabs and holding them with their legs and claws and the points of their carapace free and extending laterally, means on opposite sides of the conveyor for striking the legs and claws on each side of each crab repeated blows to flex the legs and claws relative to the carapace, a second conveyor, holders on the second conveyor for engaging the sides of individual crabs at approximately the leg openings and holding them with their carapace up, means for freeing the carapace from the body of the crab in each holder, separate means adjacent to the second conveyor for acting on the bodies in successive holders to remove the gills, remove the mouth parts, detach the apron, clear away the waste material exposed by removal of the apron, and remove the visceral material, and means for releasing the stripped bodies from the successive holders.

2. The apparatus of claim 1 in which transfer means are provided for transferring the crab from the clamps on the first conveyor to the holder on the second conveyor.

3. The apparatus of claim 2 in which the transfer means is comprised of means for releasing the crab from the clamp after the clamp containing the crab is substantially inverted, guide elements for receiving the released crab, and means on said holder for removing the crab from said guide means and placing it in said holder.

4. The apparatus of claim 2 in which the first conveyor is positioned at a higher level than the second conveyor, and said transfer means comprised of means for releasing the clamp as the clamp containing a crab is conveyed around the end of the conveyor at the outlet end of the first conveyor, parallel guide elements positioned in the path of travel of the second conveyor to receive the crab body from the clamp and hold it carapace up, and means are provided in the holder for removing the crab from the guide elements and placing it on the holder.

5. The apparatus of claim 1, in which the means for striking the legs and claws repeated blows are beaters on pairs of shafts in upper and lower levels, the shafts of each pair in the same level lying on opposite sides of the path of travel of the clamps.

6. The apparatus of claim 1, in which the means for freeing the carapace from each body include a wedge member engaging the points of the carapace of each crab in a holder from beneath and raising the carapace as the holder advances.

7. The apparatus of claim 1, in which the separate means for removing the gills, removing the mouth parts, clearing away waste material, and removing visceral material include shafts mounted above the conveyor and transverse to the direction of movement thereof and brush-like elements mounted on the shafts above the conveyor and extending radially from the shafts.

8. In apparatus for preparing crabs for the recovery of meat therefrom, which comprises a first conveyor, clamps on the conveyor for gripping and holding crabs during the performance of several operations, a second conveyor, holders on the second conveyor for holding the crab body inverted from its position on the clamps of the first conveyor, the improvement in combination therewith comprising means for substantially inverting the clamp carrying the crab, means for releasing the crab from the clamp after the clamp containing the crab is substantially inverted, guide elements for receiving the released crab, and means on said holder for removing the crab from the guide means and placing it in said holder.

9. The apparatus of claim 8 in which the first conveyor is positioned at a higher level than the second conveyor, and in which the means for releasing the clamp is positioned to release as the clamp containing the crab is conveyed around the end of the conveyor at the outlet end of the first conveyor and the guide means comprise parallel guide elements are positioned in the path of travel of the second conveyor to receive the crab body from the clamp and hold it carapace up.

10. In apparatus for preparing crabs for recovery of the meat therefrom, the combination of a conveyor, clamps on the conveyor for gripping crabs and holding them with their legs and claws and the points of their carapace free and extending laterally, and means on opposite sides of the conveyor for striking the legs and claws on each side of each crab repeated blows to flex the legs and claws relative to the carapace.

11. The apparatus of claim 10 in which the striking means include upper and lower pairs of shafts with the shafts of each pair lying on opposite sides of the conveyor, brush-like beaters mounted radially on each of the lower shafts, the beaters first striking the points of the carapace of each crab and then striking and raising the legs and claws as the shafts rotate, relatively stiffer beaters of sheet material mounted radially on the upper shafts and passing over the points of the carapace and striking the legs and claws in raised position to urge them upward as the shafts rotate, and means for rotating the shafts of each pair in opposite directions and the shafts on the same side of the conveyor in the same direction.

12. The combination of claim 10, in which each clamp includes a fixed jaw providing a seat for a crab and an abutment for one end of the crab, a member pivotally mounted on the fixed jaw, and a movable jaw pivotally mounted on the member and having an abutment for the other end of the crab.

13. In apparatus for preparing the bodies of crabs, from which the legs and claws have been removed, for the recovery of the meat therefrom, the combination of a conveyor, holders on the conveyor for engaging the sides of individual crabs at approximately the leg openings and holding them with their carapace up, means for freeing the carapace from the body of the crab in each holder, separate means including a plurality of shafts mounted above and transversely of the conveyor at intervals and brush-like elements on the shafts acting on bodies in the holders on the conveyor adjacent to the conveyor for removing the gills, breaking off the mouth parts, detaching the apron, clearing away the waste material in the bodies exposed by removal of the apron, and means for removing the visceral material, and means for releasing the stripped bodies from the successive holders.

14. The apparatus of claim 13, in which each holder includes a plate rockable about an axis transverse to the conveyor, sets of pins mounted on top of the plate at opposite sides thereof and movable endwise toward and away from each other to enter the body of a crab on the plate between the opposed ends of the pins of the sets, and means adjacent to the conveyor for moving the sets of pins inward to engage a crab, holding the pins engaged with the crab, and moving the sets of pins outward to release the crab.

15. In apparatus for preparing the bodies of crabs stripped of the legs and claws for the recovery of meat, the combination of a conveyor, holders on the conveyor for engaging the sides of individual crabs and holding them with the carapace up, means for freeing the carapace from the body in each holder, means for tilting each holder to position the body therein with its apron in a substantially upright position, and a fixed member engaged by the apron of each body in a holder and acting to remove the apron from the body.

References Cited by the Examiner

UNITED STATES PATENTS

| | | | |
|---|---|---|---|
| 3,151,351 | 10/1964 | Reinke | 17—2 |
| 3,156,946 | 11/1964 | Moncure | 17—2 |
| 3,200,436 | 8/1965 | Moncure | 17—2 |

SAMUEL KOREN, *Primary Examiner.*

LUCIE H. LAUDENSLAGER, *Examiner.*